(12) United States Patent
Lugo et al.

(10) Patent No.: US 11,831,121 B2
(45) Date of Patent: Nov. 28, 2023

(54) CAPILLARY TUBE TO STRIP BACK-REFLECTED LIGHT

(71) Applicant: NLIGHT, INC., Camas, WA (US)

(72) Inventors: Juan Carlos Lugo, Camas, WA (US); Teemu Kokki, Camas, WA (US); Roger Farrow, Camas, WA (US); Dahv A. V. Kliner, Vancouver, WA (US)

(73) Assignee: NLIGHT, INC., Camas, WA (US)

( * ) Notice: Subject to any disclaimer, the term of this patent is extended or adjusted under 35 U.S.C. 154(b) by 0 days.

(21) Appl. No.: 17/788,677

(22) PCT Filed: Jan. 28, 2021

(86) PCT No.: PCT/US2021/015553
§ 371 (c)(1),
(2) Date: Jun. 23, 2022

(87) PCT Pub. No.: WO2021/155043
PCT Pub. Date: Aug. 5, 2021

(65) Prior Publication Data
US 2023/0036091 A1 Feb. 2, 2023

Related U.S. Application Data

(60) Provisional application No. 62/968,087, filed on Jan. 30, 2020, provisional application No. 62/968,085, filed on Jan. 30, 2020.

(51) Int. Cl.
*G02B 6/255* (2006.01)
*H01S 3/067* (2006.01)
*H01S 3/00* (2006.01)

(52) U.S. Cl.
CPC ........ *H01S 3/0064* (2013.01); *H01S 3/06704* (2013.01)

(58) Field of Classification Search
CPC ...... H01S 3/0064; H01S 3/06704; H01S 3/67; H01S 3/06708; G02B 6/02066;
(Continued)

(56) References Cited

U.S. PATENT DOCUMENTS

| 10,209,453 B1* | 2/2019 | Hsia ............... G02B 6/3624 |
| 2008/0050069 A1* | 2/2008 | Skovgaard ........ G02B 6/2856 |
| | | 385/24 |

(Continued)

FOREIGN PATENT DOCUMENTS

| CN | 103280691 A | 9/2013 |
| JP | 2007271786 A | 10/2007 |

(Continued)

OTHER PUBLICATIONS

RU Patent Office; International Search Report; PCT/US2021/015553 dated May 13, 2021; 7 Pages.

(Continued)

*Primary Examiner* — Xinning (Tom) Niu
(74) *Attorney, Agent, or Firm* — Schwabe Williamson & Wyatt

(57) ABSTRACT

Some embodiments may include a fiber laser including two or more input fibers and an output fiber to deliver a beam to a workpiece, the fiber laser comprising. The fiber laser may include a combiner having ends and a length, wherein the combiner is arranged to release, from its length, a portion of back-reflected light received from the output fiber at an output end of the ends from the combiner, the combiner including: a capillary tube to enclose part of the two or more input fibers at an input end of the ends of the combiner, the capillary tube having ends and a length located between the ends of the capillary tube; and a cladding light stripper (CLS) defined by part of the length of the capillary tube, wherein the CLS provides the release of the portion of the (Continued)

back-reflected light. Other embodiments may be disclosed and/or claimed.

20 Claims, 7 Drawing Sheets

(58) Field of Classification Search
CPC ........ G02B 6/14; G02B 6/264; G02B 6/2852; G02B 6/262; G02B 6/34; G02B 6/036
See application file for complete search history.

(56) References Cited

U.S. PATENT DOCUMENTS

| | | |
|---|---|---|
| 2008/0267228 A1 | 10/2008 | Sacks et al. |
| 2010/0135339 A1* | 6/2010 | Meleshkevich .... G02B 6/03616 385/124 |
| 2011/0182308 A1 | 7/2011 | Ullman et al. |
| 2012/0069860 A1 | 3/2012 | Inbar et al. |
| 2012/0070115 A1* | 3/2012 | Langseth ................. G02B 6/14 427/163.2 |
| 2013/0136146 A1* | 5/2013 | Creeden ............ H01S 3/094053 372/6 |
| 2014/0211818 A1* | 7/2014 | Hou .................... H01S 3/06729 372/6 |
| 2017/0153400 A1* | 6/2017 | Kasai .................... H01S 5/0235 |
| 2017/0329085 A1* | 11/2017 | Kliner .................... G02B 6/036 |

FOREIGN PATENT DOCUMENTS

| | | |
|---|---|---|
| JP | 2008187100 A | 5/2008 |
| JP | 2011186399 A | 9/2011 |
| WO | WO2013/001734 A1 | 1/2013 |
| WO | WO2015/115637 A1 | 8/2015 |

OTHER PUBLICATIONS

RU Patent Office; International Search Report and Written Opinion PCT/US2021/015544 dated May 13, 2021; 9 Pages.
RU Patent Office; International Preliminary Report on Patentability PCT/US2021/015544 dated Aug. 11, 2022; 6 Pages.
RU Patent Office; International Preliminary Report on Patentability PCT/US2021/015553 dated Aug. 11, 2022; 5 Pages.

* cited by examiner (Background)

(Background)

(Background)

CAPILLARY TUBE TO STRIP BACK-REFLECTED LIGHT

PRIORITY

The present application is a National Phase entry under 35 U.S.C. § 371 of International Application No. PCT/US2021/015553, filed on Jan. 28, 2021, which claims priority to U.S. Provisional Application No. 62/968,085 filed on Jan. 30, 2020, entitled CAPILLARY CLADDING LIGHT STRIPPER FOR COMBINER, and U.S. Provisional Application No. 62/968,087 filed on Jan. 30, 2020, entitled THERMAL PATH OPTIMIZED OPTICAL SIGNAL COMBINER HOUSING, the entire contents of these applications are incorporated herein by reference in their entirety.

TECHNICAL FIELD

The present disclosure relates to fiber lasers.

BACKGROUND

Fiber lasers are widely used in industrial processes (e.g., cutting, welding, cladding, heat treatment, etc.) In some fiber lasers, the optical gain medium includes one or more active optical fibers with cores doped with rare-earth element(s). The rare-earth element(s) may be optically excited ("pumped") with light from one or more semiconductor laser sources.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

FIG. 1A illustrates a schematic view of a known combiner with a capillary tube.

FIGS. 1B-C illustrate a cross-sectional views taken along section line A of FIG. 1A, according to various embodiments.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Capillary Tube to Strip Back-Reflected Light

Figure 1A:
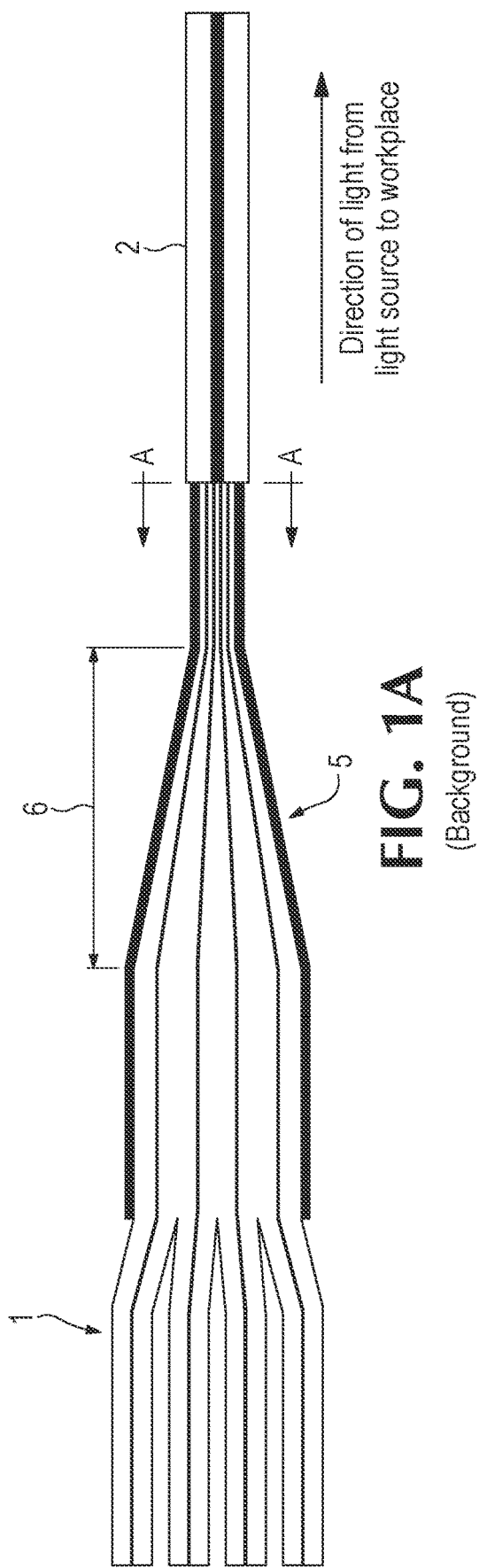
Figure 1C:
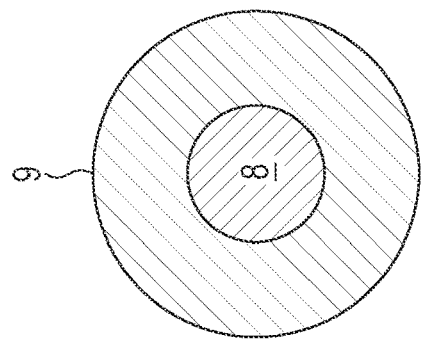
Figure 1B:
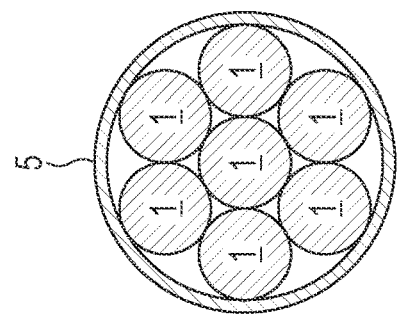

FIG. 1A illustrates a schematic view of a known combiner with a capillary tube 5. The capillary tube 5 encloses input fibers 1 received at a first end of the combiner. An output fiber 2 may be fused to a second end of the combiner. FIG. 1B illustrates a cross-sectional view taken along section line A in the direction of the arrows. FIG. 1C illustrates a cross-sectional view taken along section line A in the direction opposite to the arrows (a core section 8 of the output fiber and a non-core 9 section are shown). FIGS. 1A-C illustrate one example of a known combiner in which the capillary tube 5 has a tapered section 6, but it is known that other combiners may have a non-tapering capillary tube (e.g., with a uniform outer diameter from end-to-end).

When a high-power fiber laser is used for material processing, such as cutting or welding, some of the light reflected from the workpiece gets coupled back into a feeding fiber and propagates back to the laser. If the laser has a capillary-type combiner, such as the combiner of FIGS. 1A-C or any combiner with a capillary tube (tapered or non-tapered), some of the light will transmit through the combiner and travel backwards in the combiner input fibers' cores and claddings.

However, a part of the back-reflected light may also couple into the capillary tube. The light that couples into the capillary tube may either get absorbed by any bonding material used to hold the capillary tube in place (in the case of high-index material), or travel through the entire capillary tube and exit from the end face of the capillary tube (in the case of low-index bonding material). In the former case, the bonding material will get burned, in the latter the input fibers and/or other components inside the laser may get damaged.

To avoid these problems, a cladding light stripper may be manufactured on the capillary tube. This may cause any light that couples into the capillary tube to scatter out of the length of the capillary tube, which may prevent the bonding material from getting burned and/or prevent the input fibers and/or other components inside the fiber laser from being damaged.

Figure 2:
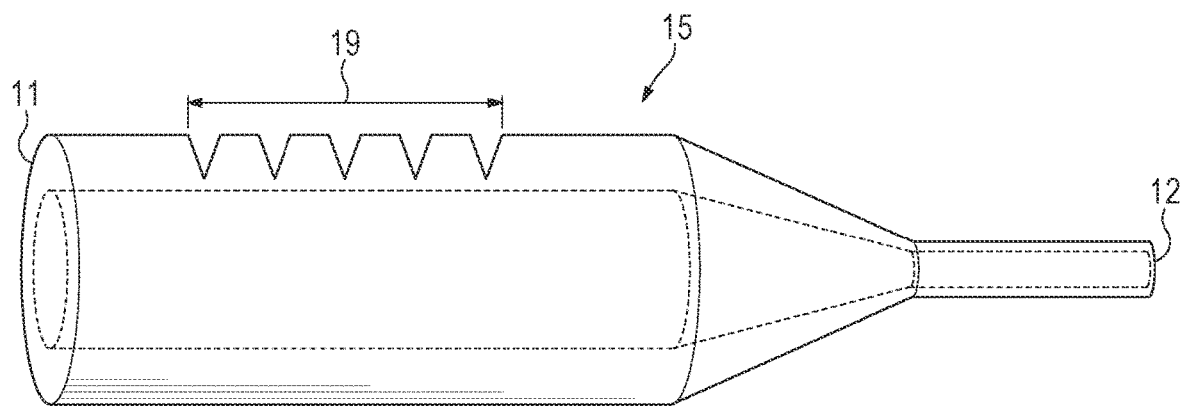
FIG. 2 illustrates a side view of a capillary tube to strip back-reflected light, according to various embodiments.

FIG. 2 illustrates a side view of a capillary tube 15 to strip back-reflected light, according to various embodiments. The capillary tube 15 has ends 11 and 12, and a length. The ends 11 and 12 may be similar in any respect to the ends of the capillary tube 5 of FIG. 1A, e.g., the first end 11 may enclose part of two or more input fibers (each of which may be similar in any respect to an individual one of input fibers 1 shown in FIG. 1), and the second end 12 may be fused to an output fiber (which may be similar in any respect to output fiber 2 shown in FIG. 1).

The length of the capillary tube 15 includes a light stripping feature 19 to strip out back-reflected light traveling through the capillary tube 15. The light stripping feature 19 may be provided by any method, now known or later developed, used to manufacture a cladding light stripper (CLS). In this example, the light stripping feature 19 is provided by making transverse grooves with a $CO_2$ laser. In other examples, the $CO_2$ laser could be used to make one or more continuous helical grooves around an exterior of the capillary tube 15.

In other embodiments, a roughened surface may be provided on an exterior of the capillary tube 15 by adding material to the exterior of the capillary tube 15 (in addition to, or instead of, removing material from the capillary tube 15). In yet other embodiments, a light stripping feature 19 may be provided by otherwise perturbing an exterior of the capillary tube 15 (e.g., submerging the capillary tube 15 in a fluid).

Figure 3A:
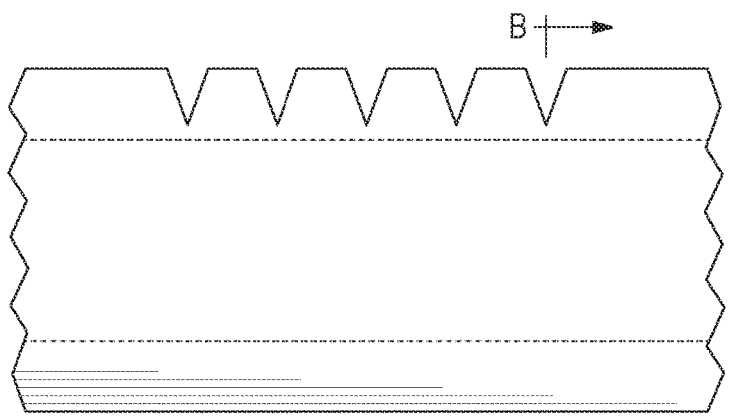
FIGS. 3A and 3B illustrate a side and top view, respectively, of a light stripping section of the capillary tube of FIG. 2, according to various embodiments.
Figure 3B:
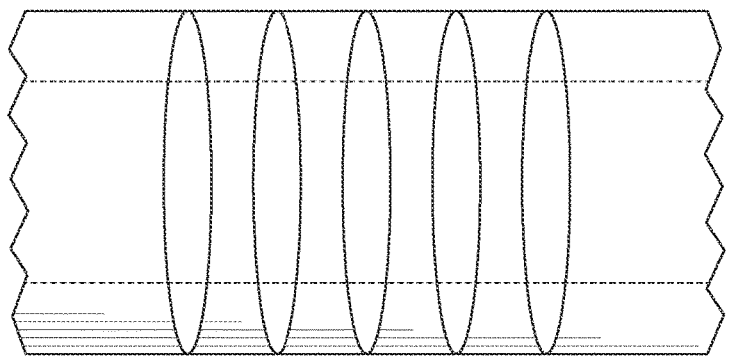
Figure 3C:
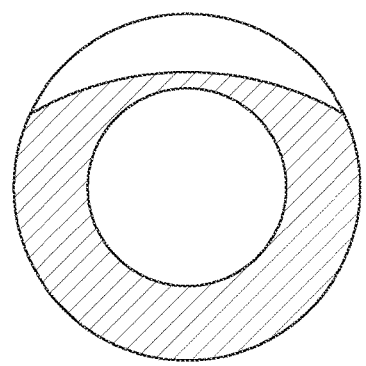
FIG. 3C illustrates a cross-sectional view taken along section line B of FIG. 3A, according to various embodiments.

In this example, the light stripping feature 19 is located on the top of the capillary tube 15, so that stripped out light is released from the top of the capillary tube 15. FIGS. 3A and 3B illustrate a side and top view, respectively, of a light stripping section of the capillary tube 15. FIG. 3C illustrates a cross-sectional view taken along section line B of FIG. 3A.

This shows that the groove has variable depth, although this is not required (in other examples, a groove could have a uniform depth).

Referring again to FIG. 2, the light stripping feature 19 may be located on other parts of the capillary tube 15, say entirely around the capillary tube 15 which may scatter the back-reflected light above, below, and to the sides of the capillary tube 15. The location for the light stripping feature 15 may be selected to direct the stripped out light to a desired location consistent with a heat dissipation arrangement of the fiber laser.

In FIG. 2, the light stripping feature 19 is located exclusively on a non-tapering section of the capillary tube 15. In other embodiments, the light stripping feature 19 may be located on some other section of the capillary tube, such as on the tapering section or on both sections.

Figure 4:
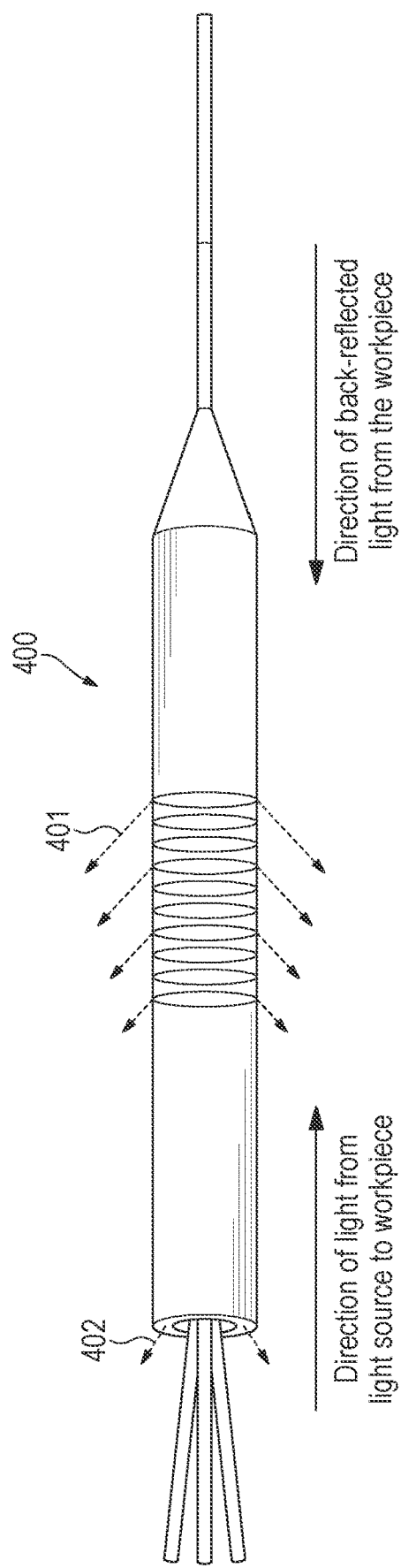
FIG. 4 illustrates a top view of a fiber laser employing the capillary tube of FIG. 2, according to various embodiments.

FIG. 4 illustrates a top view of a fiber laser 400 including a combiner employing the capillary tube 15 of FIG. 2. A portion 401 of the back-reflected light is released from the length of the combiner. A different portion 402 of the back-reflected light is released from an end of the combiner. The portion 402 may include back-reflected light transmitted through the combiner by traveling backwards in the combiner input fibers' cores and claddings. The portion 402 of the light may include a reduced amount of the light coupled into the capillary tube (due to the light stripping feature 19, FIG. 2), which may prevent bonding material from getting burned and/or prevent the input fibers and/or other components inside the fiber laser from being damaged. In this example, the capillary tube tapers to the output end of the combiner, but this is not required in embodiments with tapering sections (nor is any tapering of the capillary tube required in various embodiments).

Figure 5:
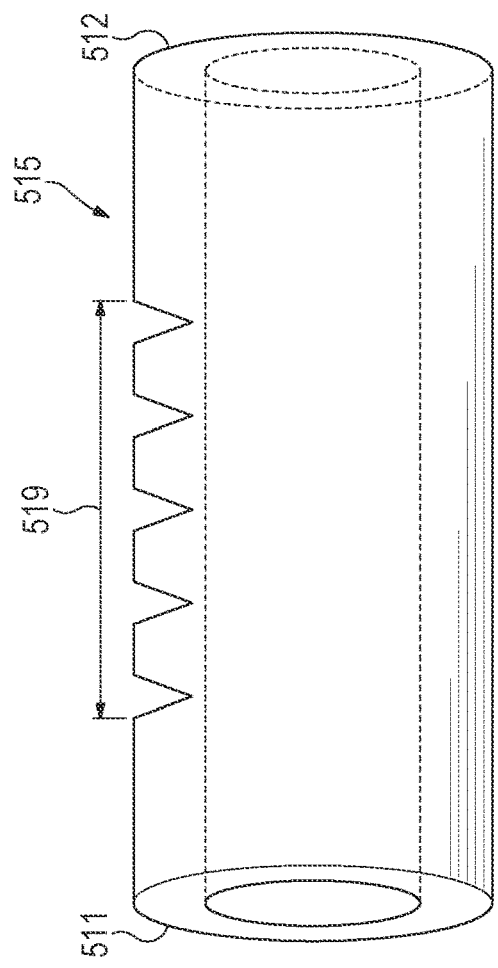
FIG. 5 illustrates a side view of another capillary tube to strip back-reflected light, according to various embodiments.

FIG. 5 illustrates a side view of another capillary tube 515 to strip back-reflected light, according to various embodiments. This capillary tube 515 has no tapering section (e.g., a uniform outer diameter from end-to-end). This capillary tube 515 also has a uniform inner diameter, and ends 511 and 512 are identical, but other embodiments could have a non-uniform inner diameter and/or non-identical ends. The light stripping feature 519 may be similar in any respects to the light stripping feature 19 (FIG. 2) or any other light stripping feature described herein.

In various embodiments, any capillary tube may be enclosed (fully or partially) in a housing. The housing may define a chamber, and at least the part of the capillary tube having the light stripping feature may be located in the chamber. The chamber may be sized to provide a gap between the interior of the chamber and the part of the exterior of the capillary tube corresponding to the light stripping feature.

An interior of the housing may be arranged to absorb light at a wavelength associated with the back-reflected light. In some embodiments, this may include roughing the interior of the housing. The housing may be formed from any material, and in some embodiments the selected materials may be chosen to optimize heat conduction (so that heat generated from absorbing the back-reflected light can be quickly dissipated).

In any embodiment described herein, a diameter of a core of the output fiber may be larger than an outer diameter of a face of the output end of the combiner (the capillary tube may taper to the output end of the combiner). Although this may cause the back-reflected light to enter the face of the tapered end of the capillary tube from an overlapping part of the core, the light stripping feature of the capillary combiner may compensate to prevent damage from heating as described herein. Any combiner described herein may be a pump combiner or a signal combiner.

Various embodiments described above provide a capillary tube to strip back-reflected light. In some of these embodiments, optionally, the capillary tube may be arranged in a housing to collect heat from the stripped light. In embodiments in which a housing is employed, optionally, the housing may utilize any thermal path optimized optical signal combiner housing features described herein. In other embodiments in which a housing is employed, the housing may include some other thermal management or packaging features now known or later developed.

Thermal Path Optimized Optical Signal Combiner Housing

A fiber optic assembly, such as one including a capillary tube to strip back-reflected light, some other combiner, or any other fiber optic assembly, may need to be packaged in a housing the minimizes mechanical stresses and still provides good thermal performance. Available materials are a compromise of coefficient of expansion and thermal conductivity. Materials that have coefficients of thermal expansion that closely match that of the optical assembly typically have lower thermal conductivity, but materials that provide improved thermal conductivity typically have a higher than optimal coefficient of thermal expansion.

During normal combiner operation, a relatively low constant energy level needs to be dissipated. To maintain consistent optical properties this energy needs to be removed with minimal localized heating to minimize thermal expansion of the components. This may reduce changes in stress on the optical assembly that can result in changes in its performance.

Along with normal combiner operation, other operating situations need to be considered. A typical scenario, when the laser is making a cut on reflective metal, is that a portion of the cutting light may reflect and may travel back to the laser through the fiber optic. Reflected light that is in the fiber optic's cladding is easily stripped out before the combiner, however light that is reflected into the core may end up passing into the combiner. A significant percentage of that energy may be dissipated in the combiner assembly. Typically, these energy events peak at the start of a cut before the laser has penetrated the material. These events are short in duration but can cause localized heating of the combiner components. Additionally, there are many other situations that can generate high or sustained back-reflected power (e.g., welding, or additive manufacturing).

A solution to the above described problems with localized thermal stress in an optical system is to minimize thermal stress to the optical system by selecting a housing material that has a coefficient of thermal expansion that closely matches that of the optical assembly. The optical assembly may be directly mounted to the housing. To minimize the thermal resistance, the housing may be mounted directly to a cold plate.

By closely coupling the housing to the cold plate, the effect of having a material with a low thermal conductivity may be minimized. Using low thermal expansion materials and controlling the heating provides a thermally and dimensionally stable platform for the optic assembly during normal operation. The closely matched coefficients of expansion minimize potential mechanical stresses that can occur from temperature changes seen during shipping and storage.

During a frustrated cut, energy from the material being cut may be reflected back into the output fiber. Energy reflected into the core of the fiber may be released from the several areas of the combiners optic assembly. In a high-power laser system, it is possible to have hundreds of watts of the back reflected energy released from the fiber core into the combiner assembly.

Typically, these may be short term events since the laser head may trigger a system shutdown or the laser may pierce the metal reducing the amount of energy that is reflected back into the system.

Low-thermal expansion materials are not typically good thermal conductors, and the housing may be susceptible to localized heating from these short-term events. This may result in localized heating of the optic component as well as the housing.

The waste energy from a back reflected cut may still need to be controlled. In various embodiments, a cover with a surface that is more absorptive than the housing is used to control the waste energy. The cover material may have a significantly higher thermal conductivity than the material of the housing. These characteristics may allow the cover to absorb a higher percentage of the back-reflection energy while minimizing surface temperatures. By using a material with a high specific heat as well as good thermal conductivity, the waste energy may be conducted internally within the cover and temporarily stored.

The cover may be provided with a controlled thermal path to the housing. This may allow the stored energy to be dissipated over a time interval that is significantly longer than the initial thermal event. This controlled heat dissipation may limit the temperature increase of the housing and the optical components.

The cover's thermal transfer may be controlled by limiting the clamping force to the housing. This limited clamping force may also allow the cover to expand independently of the housing, minimizing mechanical stresses. Since a clamping force of the housing to a heat sink (e.g., a cold plate) may be higher than the cover to housing, the heat transfer to the cold plate may be higher. This combination of clamping forces may control the ratio of heat transfers and therefore the temperature rise of the housing as heat travels from the cover through the housing and into the heat sink.

This combination of materials and mounting may provide an optimal thermal path during normal forward operation and controlled energy dissipation control during high-energy short-term back reflection events.

The above described thermal management features may be applied to other fiber-based components, not just combiners (and not just combiners with a capillary tube having an integrated cladding light stripper). It can be used with any fiber-optic component that has to dissipate heat. The above described thermal management features may also be applicable to other situations that can generate high or sustained back-reflected power (e.g., welding, additive manufacturing).

Figure 6:
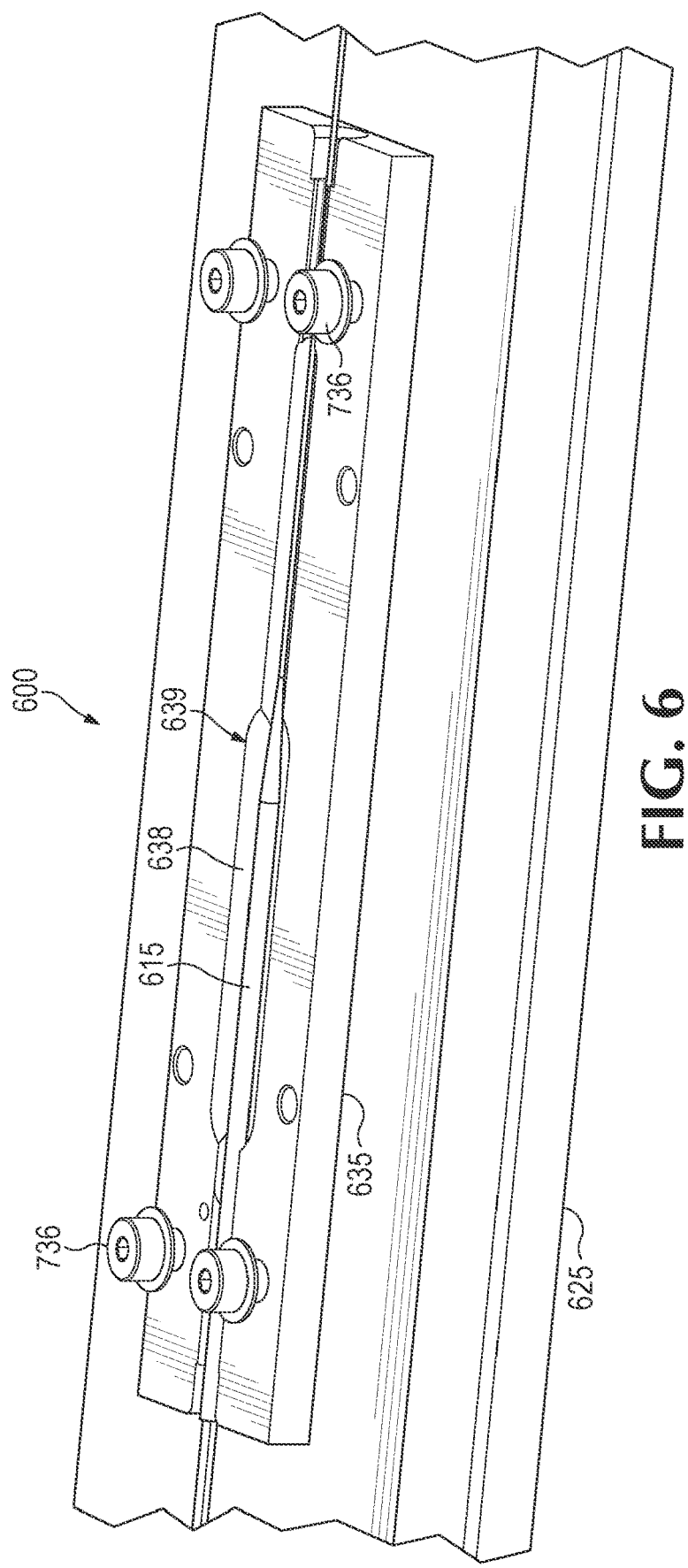
FIG. 6 illustrates an isometric view of a thermal path optimized optical signal combiner housing, with its cover removed, according to various embodiments.
Figure 7:
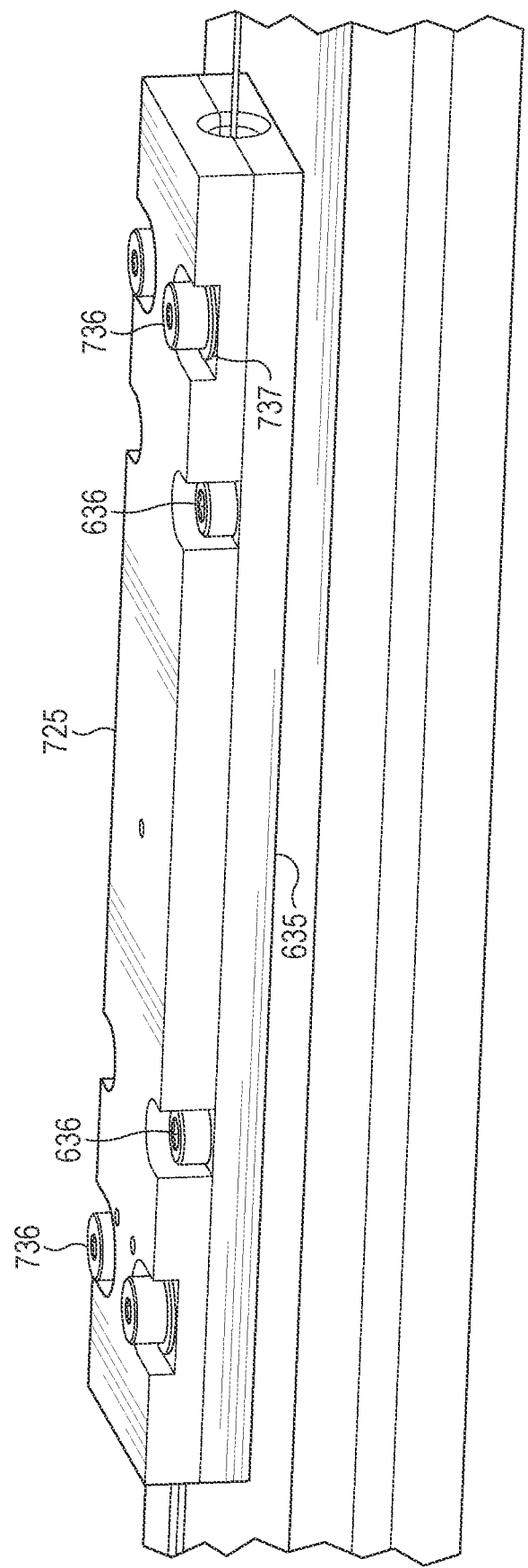
FIG. 7 illustrates a side view of the thermal path optimized optical signal combiner housing of FIG. 6, with the cover attached, according to various embodiments.

FIG. 6 illustrates an isometric view of a thermal path optimized optical signal combiner housing 635, with its cover removed, according to various embodiments. FIG. 7 illustrates a side view of the thermal path optimized optical signal combiner housing 635, with the cover 725 attached (the cover 725 may also be referred to as a lid), according to various embodiments.

Referring to FIG. 6, the housing 635 may have a first side thermally coupled to a heat sink 625, such as a cold plate. A second side (e.g., a second opposite side) of the housing 635 defines a bottom and/or sides of a chamber 639. A top of the chamber 639 may be defined by an underside of the cover 725 (FIG. 7). In this embodiment, the chamber 639 may be exposed to air.

Referring again to FIG. 6, an optical fiber 615 may be mounted to the housing 635, and a part of a length of the optical fiber 615 to release back-reflected light may be positioned in the chamber 639. In this embodiment, this part of the length includes the capillary tube 15 (FIG. 2). In other embodiments, the part of the length of the optic fiber 615 may include some other combiner, some other optical component, or some other optical fiber length that may release light, such a splice point.

The chamber 639 includes angled sides 638, which may be plated to form a reflective surface. The plating may be with a different material than the housing, such as gold or some other material that can form a highly reflective surface. When back-reflected light is emitted from the capillary tube 15 (FIG. 2) as described herein, the light may reflect off the angled sides 638 away from the optical fiber 615 (to avoid damaging components of the optical fiber 615). This light may be received at the top of the chamber 639 (e.g., part of the underside of the cover 725, FIG. 7). The part of the underside of the cover 725 may be roughened or otherwise arranged to absorb light received on it.

The cover 725 may be made of a same material as the heat sink 625, or some other material with a good thermal conductivity (e.g., copper). Therefore, the heat received by the underside of the cover 725 may move throughout the cover 725 during or after the event in which the back-reflected light is released from the capillary tube 15 (FIG. 2). The cover 725 may reach a high temperature, such as a high uniform temperature, as it collects and temporarily stores heat, protecting parts of the optical fiber 615 from receiving that heat.

The housing 635 may be made from a material having a coefficient of thermal expansion that is closely matched to a coefficient of thermal expansion of a material of the optical fiber 615. In some embodiments, the housing material may be invar, or some other material having a closely matched coefficient of thermal expansion (the terms "closely matched" as used herein may mean more closely matched than the material of the cover 725). The housing material need not have the same thermal conductivity properties as the material of the cover 725 and/or the heat sink 625. Therefore, if the housing 635 expands from heat, it may expand similarly as the optical fiber 615 that is mounted on the housing 635, which avoids physical stress on the optical fiber 615.

A clamping force between the cover 725 and the housing 635 may be less than a clamping force between the housing 635 and the heat sink 625. This may allow the cover 725 to expand differently than the second side of the housing 635 without imparting expansion stress to the second side of the housing 635 (which could, if imparted to the second side, could then be imparted into the optic fiber 615 mounted to the second side of the housing 635). Therefore, although the cover 725 (FIG. 7) may expand differently than the housing 635, there may be no damage to the optic fiber 615.

Due to the lower clamping force between the housing 635 and the cover 725, and due to the reduced thermal conductivity of the housing 635 (compared to the cover 725 and/or the heat sink 625), the cover 725 may operate as a "thermal battery." Specifically, the cover 725 may quickly reach a uniform temperature during or after the event in which the back-reflected light is released. Then, in a later time period, transfer of that heat from the cover 725 to the heat sink 625 through the housing 635 may be controlled by the lower thermal conductivity of the material of the housing 635 and/or the low clamping force. In this process, the housing 635 may never reach a same high temperature as the cover 725, but even if it did, any expansion of the housing 635 may closely match any expansion of the optic fiber 615.

Figure 8:
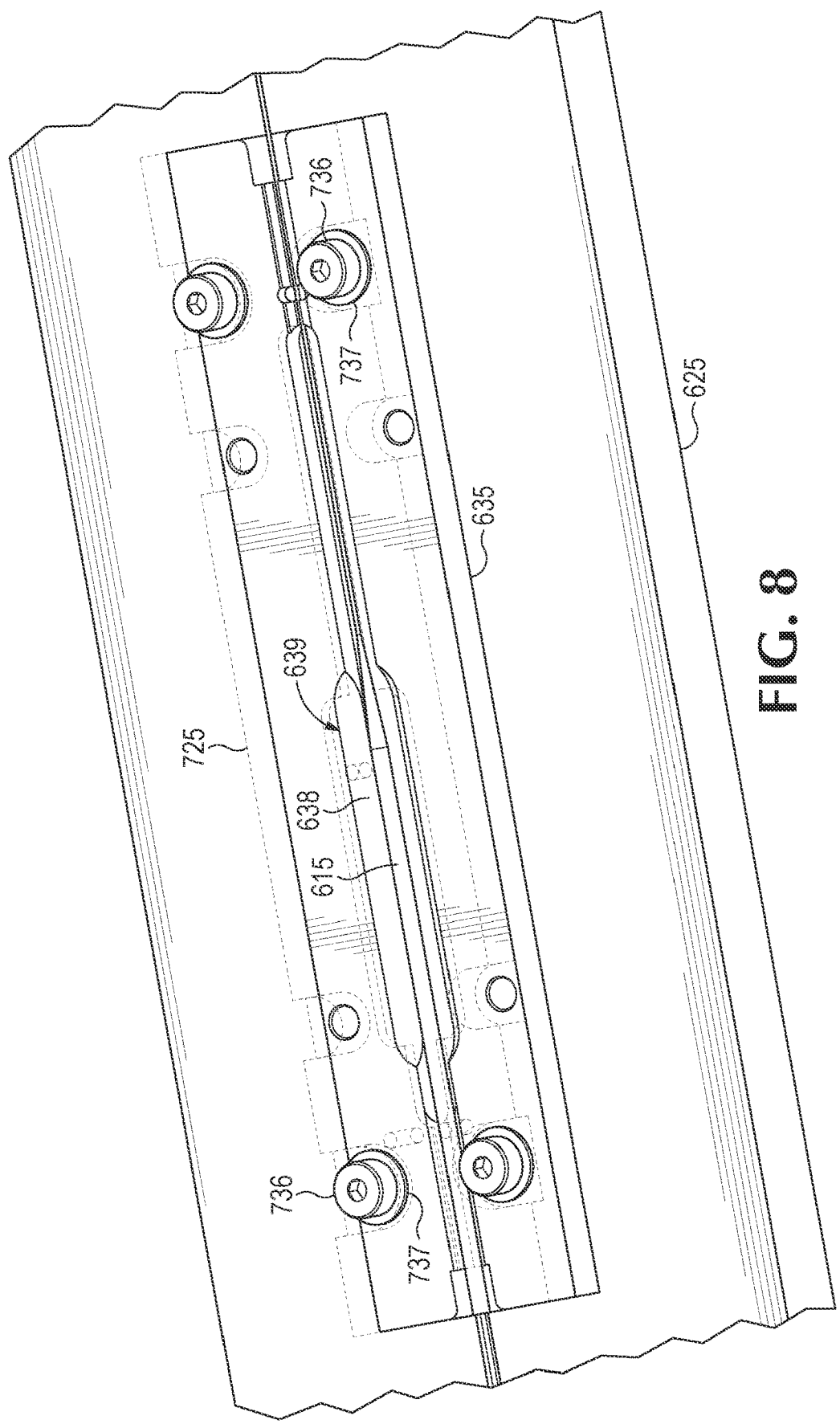
FIG. 8 illustrates a partially transparent isometric view of the thermal path optimized optical signal combiner housing of FIG. 6, with the cover attached, according to various embodiments.
Figure 9:
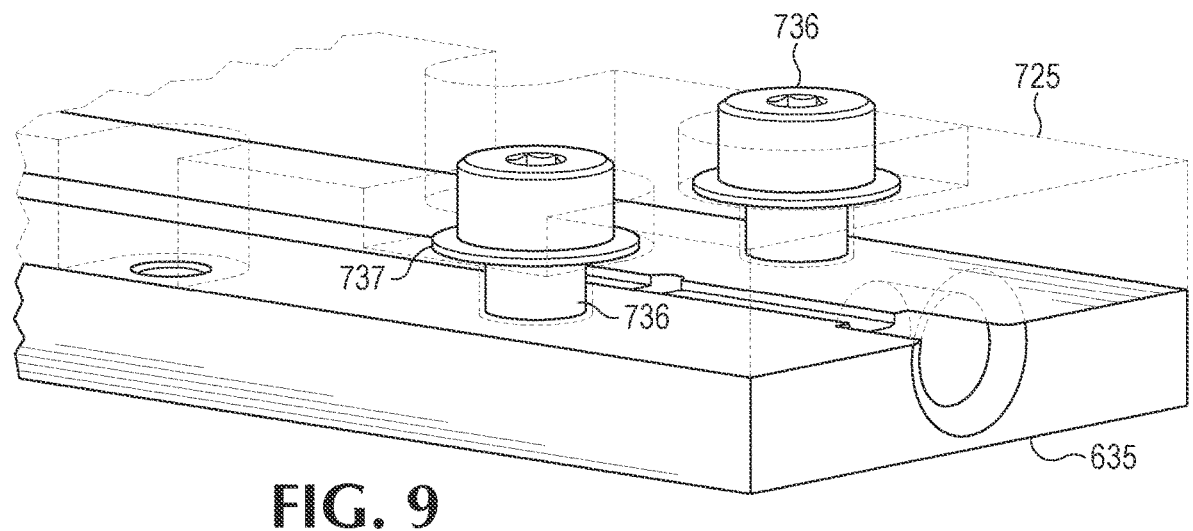
FIG. 9 illustrates an partially transparent isometric view showing a detailed view of fasteners of the partially transparent isometric view of the thermal path optimized optical signal combiner housing of FIG. 6, according to various embodiments.

The fasteners 736 (FIG. 7) that clamp the cover 725 to the second side of the housing 635 may be different than the fasteners 636 that clamp the first side of the housing 635 to the heat sink 625. In this embodiment, the fasteners 736 include a shoulder screw and a spring washer 737, but in other embodiments any spring fastener now know or later developed may be used. FIGS. 8 and 9 illustrate the attachment between the cover 725 and the second side of the housing 635.

Figure 10:
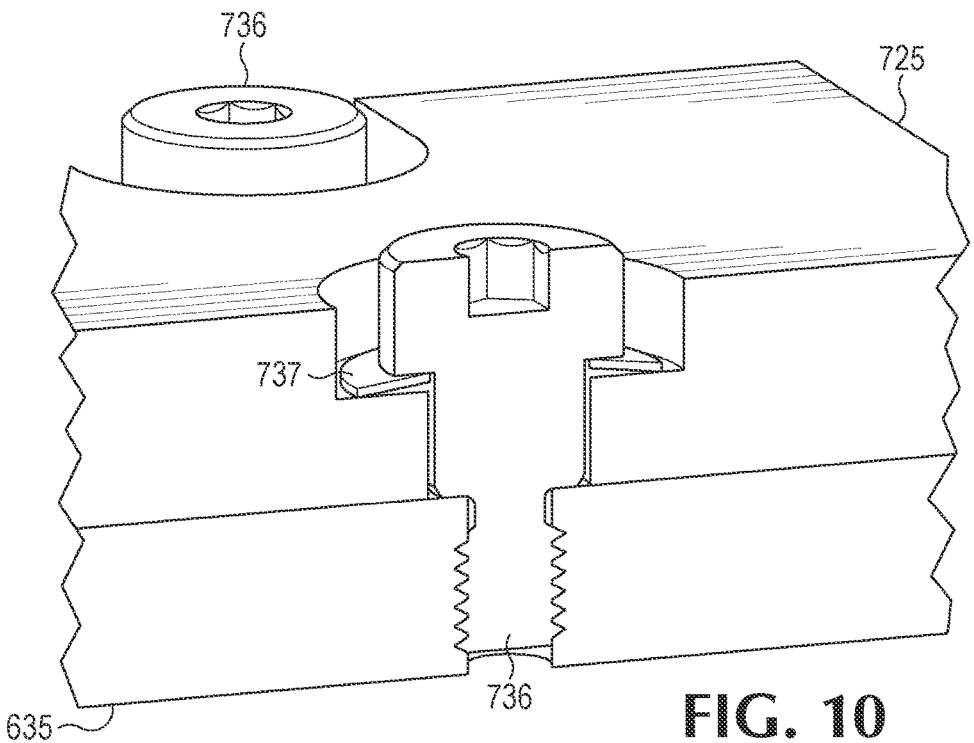
FIG. 10 illustrates a cross sectional view of the partially transparent isometric view of the thermal path optimized optical signal combiner housing of FIG. 6 taken along one of the fasteners illustrated in FIG. 9, according to various embodiments.

FIG. 10 illustrates a cross sectional view of the partially transparent isometric view of the thermal path optimized optical signal combiner housing 635 of FIG. 6 taken along one of the fasteners 736, according to various embodiments. In this example, the fastener 736 is a shoulder screw has a shoulder section between a threaded section and a head. The length of the shoulder section may control how much far the fastener 736 is driven down. The spring washer 737 may be located in a gap between an underside of the head and the bottom of the counter bore in the top of the cover 725.

In the illustrated embodiment, the part of the length of the optic fiber 615 (FIG. 6) positioned in the chamber 639 includes the capillary tube 15 (FIG. 2), and the light received on the cover 725 is back-reflected light. In other embodiments, an optical fiber used with the housing 635 may include some other optical component (such as a combiner that does not include the capillary tube 15), and this combiner or other optical component may be positioned in the chamber 639, and the light received on the cover 725 may be back-reflected light or some other light. In various embodiments, more than one housing similar to housing 635 may be used in a fiber laser for different components located along a length of the optical fiber. Any splice point along the length of the optical fiber may release some light, and any such splice point may be positioned in a chamber of one of the housings.

EXAMPLES

Example 1 is a fiber laser including two or more input fibers and an output fiber to deliver a beam to a workpiece, the fiber laser comprising: a combiner having ends and a length, wherein the combiner is arranged to release, from its length, a portion of back-reflected light received from the output fiber at an output end of the ends from the combiner, the combiner including: a capillary tube to enclose part of the two or more input fibers at an input end of the ends of the combiner, the capillary tube having ends and a length located between the ends of the capillary tube; and a cladding light stripper (CLS) defined by part of the length of the capillary tube, wherein the CLS provides the release of the portion of the back-reflected light.

Example 2 includes the subject matter of example 1 or any other example herein, further comprising a housing enclosing at least the part of the length of the capillary tube, wherein part of an interior of the housing is arranged to absorb light at a wavelength associated with the back-reflected light.

Example 3 includes the subject matter of any of examples 1-2 or any other example herein, wherein the housing defines a chamber, wherein the part of the length of the capillary tube is located within the chamber, and wherein the chamber is sized to provide a gap between the interior of the chamber and an outer surface of the part of the length of the capillary tube.

Example 4 includes the subject matter of any of examples 1-3 or any other example herein, wherein the outer surface comprises notches arranged to direct the back-reflected light to the part of the interior of the housing that is arranged to absorb light at a wavelength associated with the back-reflected light.

Example 5 includes the subject matter of any of examples 1-4 or any other example herein, wherein an outer surface of the part of the length of the capillary tube is roughened.

Example 6 includes the subject matter of any of examples 1-5 or any other example herein, wherein the combiner comprises a signal combiner.

Example 7 includes the subject matter of any of examples 1-6 or any other example herein, wherein the capillary tube tapers to the output end of the combiner or otherwise includes a tapered section.

Example 8 includes the subject matter of any of examples 1-7 or any other example herein, wherein the part of the length of the capillary tube comprises a non-tapered part of the length of the capillary tube.

Example 9 includes the subject matter of any of examples 1-8 or any other example herein, wherein a face of one of the ends of the capillary tube has an outer diameter that is smaller than a diameter of a core of the output fiber, wherein some of the back-reflected light enters the face of the end of the capillary tube from an overlapping part of the core.

Example 10 includes the subject matter of any of examples 1-9 or any other example herein, wherein the output fiber is fused to the output end of the combiner.

Example 11 is an optical fiber assembly including an optical fiber having a first end, a second end, and a length, wherein light is released from part of a length of the optical fiber, the optical fiber assembly comprising: a heat sink; a housing having a first side and a second side, wherein the first side of the housing is thermally coupled to the heat sink, wherein part of the second side of the housing defines a bottom or sides of a chamber, and wherein said part of the length of the optical fiber assembly is positioned in the chamber; and a cover thermally coupled to the second side of the housing, wherein part of an underside of the cover defines a top of the chamber. According to various embodiments, the optical fiber assembly of example 11, or any of examples 12-30, or any other example herein, may be part of the fiber laser of any of examples 1-10.

Example 12 includes the subject matter of example 11 or any other example herein, wherein the housing is formed from a first material, and the cover is formed from a second material that is different than the first material.

Example 13 includes the subject matter of any of examples 11-12 or any other example herein, wherein the first material has a coefficient of thermal expansion that is more closely matched to a coefficient of thermal expansion of a material of the optical fiber than the second material.

Example 14 includes the subject matter of any of examples 11-13 or any other example herein, wherein the second material has a thermal conductivity that is greater than the first material.

Example 15 includes the subject matter of any of examples 11-14 or any other example herein, wherein the heat sink is formed from a third material, wherein the third material has a thermal conductivity that is greater than the first material.

Example 16 includes the subject matter of any of examples 11-15 or any other example herein, wherein the bottom or the sides of the chamber comprise have a first reflectivity, and wherein the part of the underside of the cover comprises a second reflectivity that is less than the first reflectivity.

Example 17 includes the subject matter of any of examples 11-16 or any other example herein, wherein the bottom or the sides of the chamber are plated with a reflective metal.

Example 18 includes the subject matter of any of examples 11-17 or any other example herein, wherein the part of the underside of the cover is roughened.

Example 19 includes the subject matter of any of examples 11-18 or any other example herein, wherein the sides of the chamber are sloped to reflect the released light away from the optical fiber.

Example 20 includes the subject matter of any of examples 11-19 or any other example herein, wherein an interior of the chamber is exposed to air.

Example 21 includes the subject matter of any of examples 11-20 or any other example herein, wherein the second end of the optical fiber is arranged to deliver a beam to a workpiece, and wherein the released light comprises part of back-reflected light from the workpiece.

Example 22 includes the subject matter of any of examples 11-21 or any other example herein, wherein the housing is mounted to the heat sink using a first fastener associated with a first clamping force, and wherein the cover is mounted to the second side of the housing using a second fastener associated with a second different clamping force.

Example 23 includes the subject matter of any of examples 11-22 or any other example herein, wherein the second clamping force is less than the first clamping force.

Example 24 includes the subject matter of any of examples 11-23 or any other example herein, wherein the second fastener comprises a spring fastener.

Example 25 includes the subject matter of any of examples 11-24 or any other example herein, wherein the spring fastener comprises a spring washer and a shoulder screw.

Example 26 includes the subject matter of any of examples 11-25 or any other example herein, wherein the heat sink comprises a cold plate.

Example 27 includes the subject matter of any of examples 11-26 or any other example herein, wherein optical fiber assembly is arranged to collect heat in the cover in a first time period, and then transfer a portion of the collected heat into the heat sink through the housing over a second subsequent time period that is longer than the first time period.

Example 28 includes the subject matter of any of examples 11-27 or any other example herein, wherein the part of the length of the optical fiber comprises a combiner having ends and a length, wherein the combiner is arranged to release, from its length, a portion of back-reflected light received from the output fiber at an output end of the ends of the combiner.

Example 29 includes the subject matter of any of examples 11-28 or any other example herein, wherein the part of the optical fiber includes: two or more input fibers; and an output fiber to deliver a beam to a workpiece; and a combiner having ends and a length, wherein the combiner includes a capillary tube to enclose part of the two or more input fibers at an input end of the ends of the combiner, wherein the output fiber is coupled to an output end of the ends of the combiner.

Example 30 includes the subject matter of any of examples 11-29 or any other example herein, wherein the part of the optical fiber comprises a splice point.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. An optical fiber assembly including two or more input fibers and an output fiber to deliver a beam to a workpiece, the optical fiber assembly comprising:
   a combiner having ends and a length, wherein the combiner is arranged to release, from its length, a portion of back-reflected light received from the output fiber at an output end of the ends from the combiner, the combiner including:
      a capillary tube to enclose part of the two or more input fibers at an input end of the ends of the combiner, the capillary tube having ends and a length located between the ends of the capillary tube; and
      means for stripping light integrated with part of the length of the capillary tube, wherein the light stripping means provides the release of the portion of the back-reflected light;
   wherein a face of one of the ends of the capillary tube has an outer diameter that is smaller than a diameter of a core of the output fiber, wherein some of the back-reflected light enters the face of the end of the capillary tube from an overlapping part of the core.

2. The optical fiber assembly of claim 1, further comprising a housing enclosing at least the part of the length of the capillary tube, wherein part of an interior of the housing is arranged to absorb light at a wavelength associated with the back-reflected light.

3. The optical fiber assembly of claim 2, wherein the housing defines a chamber, wherein the part of the length of the capillary tube is located within the chamber, and wherein the chamber is sized to provide a gap between the interior of the chamber and an outer surface of the part of the length of the capillary tube.

4. The optical fiber assembly of claim 3, wherein the outer surface comprises notches arranged to direct the back-reflected light to the part of the interior of the housing that is arranged to absorb light at a wavelength associated with the back-reflected light.

5. The optical fiber assembly of claim 1, wherein an outer surface of the part of the length of the capillary tube is roughened.

6. The optical fiber assembly of claim 1, wherein the combiner comprises a signal combiner.

7. The optical fiber assembly of claim 1, wherein the capillary tube tapers to the output end of the combiner or otherwise includes a tapered section.

8. The optical fiber assembly of claim 7, wherein the part of the length of the capillary tube in which the light stripping means is integrated comprises a non-tapered part of the length of the capillary tube.

9. The optical fiber assembly of claim 1, wherein the output fiber is fused to the output end of the combiner.

10. An optical fiber assembly including two or more input fibers and an output fiber to deliver a beam to a workpiece, the optical fiber assembly including:
    a combiner having ends and a length, wherein the combiner is arranged to release, from its length, a portion of back-reflected light received from the output fiber at an output end of the ends from the combiner, the combiner including:
       a capillary tube to enclose part of the two or more input fibers at an input end of the ends of the combiner, the capillary tube having ends and a length located between the ends of the capillary tube, wherein an output end of the ends of the capillary tube has an inner diameter that is less than a diameter of the output fiber and the portion of the back-reflected light enters a material of the capillary tube via a face of the output end of the capillary tube; and
       a cladding light stripper (CLS) defined by part of the length of the capillary tube, wherein the CLS provides the release of the portion of the back-reflected light from an outer surface of the part of the length of the capillary tube.

11. The optical fiber assembly of claim 10, further comprising a housing enclosing at least the part of the length of the capillary tube, wherein part of an interior of the housing is arranged to absorb light at a wavelength associated with the back-reflected light.

12. The optical fiber assembly of claim 11, wherein the housing defines a chamber, wherein the part of the length of the capillary tube is located within the chamber, and wherein the chamber is sized to provide a gap between the interior of the chamber and the outer surface of the part of the length of the capillary tube.

13. The optical fiber assembly of claim 12, wherein the outer surface comprises notches arranged to direct the back-reflected light to the part of the interior of the housing that is arranged to absorb light at a wavelength associated with the back-reflected light.

14. The optical fiber assembly of claim 11, wherein the housing includes a first side and a second side, wherein the first side of the housing is thermally coupled to a heat sink, wherein part of the second side of the housing defines a bottom or sides of a chamber, and wherein the at least the part of the length of the capillary tube is positioned in the chamber; and
    a cover thermally coupled to the second side of the housing, wherein part of an underside of the cover defines a top of the chamber.

15. The optical fiber assembly of claim 14, wherein the housing is formed from a first material, and the cover is formed from a second material that is different than the first material, and wherein:
    the first material has a coefficient of thermal expansion that is more closely matched to a coefficient of thermal expansion of a material of the optical fiber than the second material, or
    the second material has a thermal conductivity that is greater than the first material.

16. The optical fiber assembly of claim 15, wherein the heat sink is formed from a third material, wherein the third material has a thermal conductivity that is greater than the first material.

17. The optical fiber assembly of claim 14, wherein:
    the bottom or the sides of the chamber comprise have a first reflectivity, and wherein the part of the underside of the cover comprises a second reflectivity that is less than the first reflectivity, or
    the sides of the chamber are sloped to reflect the released light away from the optical fiber.

18. An optical fiber assembly including an optical fiber having a first end, a second end, and a length, wherein light is released from part of a length of the optical fiber, the optical fiber assembly comprising:

a combiner having ends and a length, wherein the combiner is arranged to release, from its length, a portion of back-reflected light received from an output fiber at an output end of the ends from the combiner;

wherein an input face of the output fiber is joined to a face of an output end of the ends of the combiner, and wherein the portion of the back-reflected light enters a material of the combiner via the face of the output end of the combiner; and a cladding light stripper (CLS) defined by part of the length of the combiner, wherein the CLS provides the release of the portion of the back-reflected light from the part of the length of the combiner.

19. The optical fiber assembly of claim 18, further comprising:

a heat sink;

a housing having a first side and a second side, wherein the first side of the housing is thermally coupled to the heat sink, wherein part of the second side of the housing defines a bottom or sides of a chamber, and wherein said part of the length of the optical fiber assembly is positioned in the chamber; and a cover thermally coupled to the second side of the housing, wherein part of an underside of the cover defines a top of the chamber.

20. The optical fiber assembly of claim 19, wherein the housing is formed from a first material, and the cover is formed from a second material that is different than the first material, and wherein:

the first material has a coefficient of thermal expansion that is more closely matched to a coefficient of thermal expansion of a material of the optical fiber than the second material, or the second material has a thermal conductivity that is greater than the first material.

\* \* \* \* \*